F. E. LONGO.
TRAIN PIPE DISCONNECTOR.
APPLICATION FILED APR. 7, 1919.
1,330,983.
Patented Feb. 17, 1920.
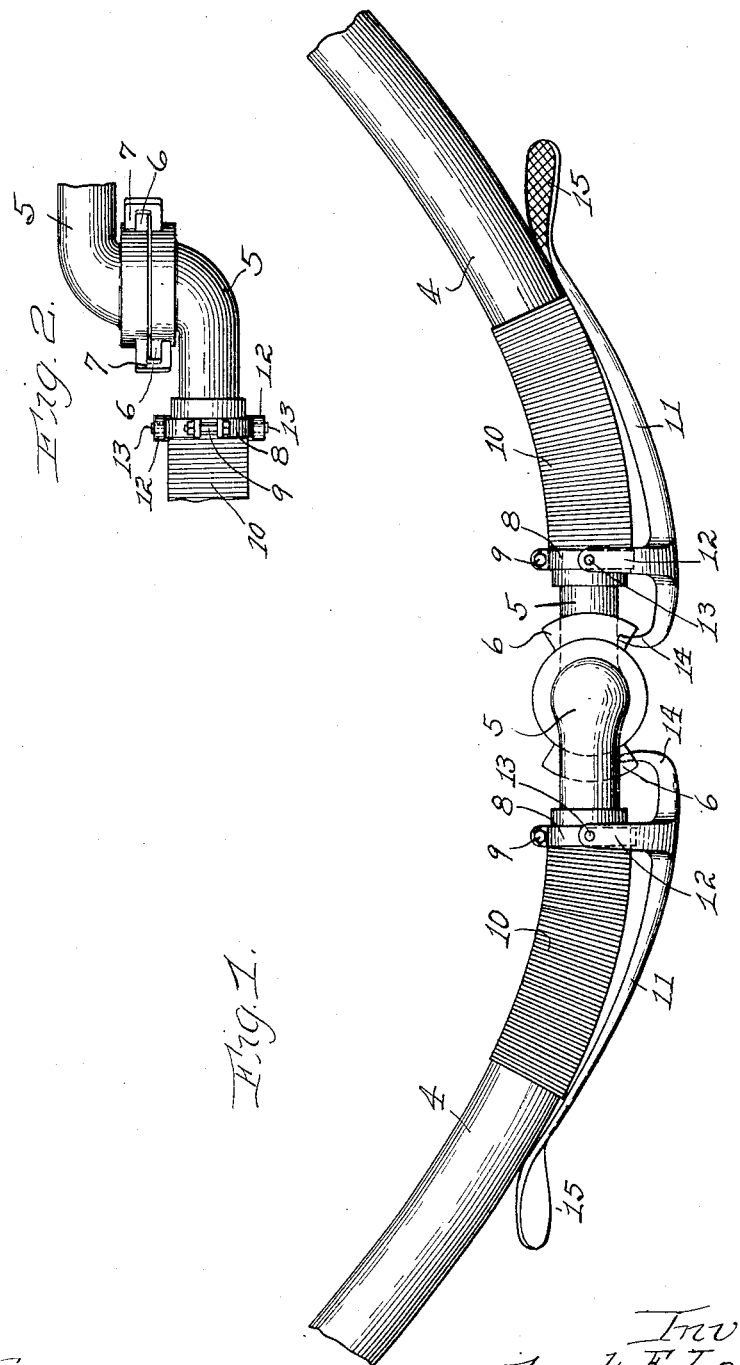
Witness:
R. L. Turrington
Inventor.
Frank E. Longo,
By Brown & Nissen
Attys

UNITED STATES PATENT OFFICE.

FRANK E. LONGO, OF BELVIDERE, ILLINOIS, ASSIGNOR OF ONE-HALF TO JOE SHERMAN, OF BELVIDERE, ILLINOIS.

TRAIN-PIPE DISCONNECTOR.

1,330,983.    Specification of Letters Patent.    Patented Feb. 17, 1920.

Application filed April 7, 1919. Serial No. 287,961.

*To all whom it may concern:*

Be it known that I, FRANK E. LONGO, a citizen of the United States, residing at Belvidere, in the county of Boone and State of Illinois, have invented certain new and useful Improvements in Train-Pipe Disconnectors, of which the following is a specification.

My invention relates to devices for uncoupling train pipes, and has for its object the provision of simple and efficient means for uncoupling standard makes of air hose used on railway cars, locomotives, and the like.

Other objects will appear hereinafter.

An embodiment of my invention is shown in the accompanying drawing, forming a part of this specification, and in which—

Figure 1 is a side view showing two train pipe ends coupled together and equipped with uncoupling devices embodying my invention; and Fig. 2 is a top view of the coupling portions of the device shown in Fig. 1.

I have indicated two flexible train pipes 4 in Fig. 1 which may be the ordinary rubber hose connections between two standard or ordinary railway cars used for conducting air from one car to the other, such as for the car brakes, and the like. In the end of each of the pipes 4 is a coupling member 5. These coupling members are also intended to indicate ordinary coupling members, such as are now in general use. The couplings 5 are usually duplicates of each other, and each arranged with a flange 6 and a locking hook member 7 arranged so that upon placing the two members 5 with their faces together and revolving through a portion of a turn, the parts 6 and 7 lock and hold the connecting members 5 in an interlocking condition. To disconnect the pipe couplings 5 it is only necessary to raise one of them, when in the position shown in Fig. 1, and cause it to rotate on the other coupling until the members 6 and 7 disengage, when the couplings will come apart.

In my improvement I provide a clamp 8 on the end portion of each of the pipes 4 where the latter passes over the portions of couplings 5 so that the clamps 8 lock the pipes 4 securely on the end portions of the couplings 5. The clamps 8 may be of any preferred design. I have shown these clamps each as being a split ring with a bolt 9 for drawing them up to clamping position on the pipes 4.

Disposed along each of the pipes 4 is a reinforcing member 10 which preferably is a coil of spring wire, but may be of any desirable substance. By making the reinforcing member 10 of a coil of spring wire with the convolutions close together, a reinforcing member having sufficient flexibility is provided, and one which is sufficiently firm to prevent kinking of the pipes 4 where the reinforcing members engage them. The end of each of the members 5 should extend into its coöperating pipe 4 sufficiently to extend a short distance into the end of the reinforcing member 10.

Disposed along each of the pipes 4 I provide a lever 11 which has two arms 12 extending partially around one of the clamps 8 with pivot pins 13 passing through the ends of the arms 12 and into the clamp 8. The pins 13 may be mounted in the clamps 8 and arms 12 in any desirable manner so as to form a pivotal mounting for the levers 11 on said clamps 8. The clamps 8 make a desirable mounting for the levers 11, but said levers may be mounted in any other desirable manner which will bring their ends 14 close to the members 5. The ends 14 preferably are disposed so that their ends normally rest substantially against the members 5 so that downward swinging of the levers 11 will cause the portions 14 to press upwardly on the members 5, as indicated in Fig. 1.

On the outer end of each of the levers 11 is a handle or foot-engaging portion 15 by means of which the person desiring to uncouple the train pipes simply presses down with his toe or hand on one of the parts 15. This pressing downwardly on the part 15 moves part 14 upwardly against its adjacent coupling 5 which tends to kink or bend the train pipes 4—4. This short bending moves the couplings 5 upon each other so as to disconnect the parts 6 and 7 to uncouple the train pipes. It will thus be seen that by simply pressing down on the part 15 the train pipes are automatically disconnected.

The parts 15 are preferably extended toward the inside which results in a straight line motion to the coupling when the foot pressure is applied in uncoupling the train pipes which allows the pipes to uncouple free and easy.

The reinforcing members 10 prevent kinking or short bending of the pipes 4 when pressure is applied by parts 15 to its coupling 5, thereby insuring the uncoupling of the train pipes. The levers are preferably positioned underneath the pipes, substantially as indicated, so that they do not interfere with either coupling or uncoupling the train pipes by hand.

I claim:—

1. In combination, a pair of interlocking train pipe couplings, pivot pins mounted on one of the pipe couplings; and a lever pivoted on said pivot pins and having one end adapted to engage one of the train pipe couplings and rotate the latter with respect to the other coupling to disconnect train pipes.

2. The combination with a pair of train pipes and interlocking couplings attached to the adjacent ends of the train pipes, of a member on one of the train pipe couplings; and a lever pivoted to said member with one end adapted to engage one of the couplings and tending upon pivotal movement to make a sharp bend at the juncture between the interlocking couplings.

3. In combination, a train pipe clamp, and a lever pivoted to said clamp and having a portion adapted to engage a train pipe and tend to form a sharp bend in said train pipe.

4. In combination, a train pipe clamp, and a lever having lateral arms extending substantially halfway around said clamp and pivoted to the latter, there being a portion of the lever extending in toward a train pipe adapted to press against said train pipe.

5. In combination, a train pipe clamp, and a lever having lateral arms extending substantially halfway around and pivoted to the clamp, one end portion of the lever extending along adjacent a train pipe with a handle portion disposed at an acute angle to the train pipe and its other end portion extending toward the train pipe.

6. The combination with a pair of train pipes and interlocking couplings attached to the adjacent ends of the train pipes, of a clamp attached to one of the train pipes, a lever extending along one of the train pipes and having two arms extending substantially halfway around said clamp, pivot pins carried by said clamp and journaled in the end portions of said arms, said lever being spaced from said clamp and having an end portion bent inwardly substantially to engagement with the adjacent train pipe coupling, and a handle portion attached to said lever for operating the latter.

7. In combination, a flexible train pipe, a clamp attached to the train pipe, a reinforcing member encircling a portion of said train pipe for stiffening the latter, and a lever pivoted to said clamp and engaging said train pipe.

8. In combination, a flexible train pipe, a coupling having a portion extending into said train pipe, a clamp clamping the train pipe on the coupling, a lever pivoted to said clamp and having a portion engaging said coupling, and a coil spring extending around said train pipe with one end of the coil spring adjacent the clamp and coupling.

In testimony whereof I have signed my name to this specification on this 3rd day of April, A. D., 1919.

FRANK E. LONGO.